United States Patent [19]

Dorr

[11] Patent Number: 4,654,834

[45] Date of Patent: Mar. 31, 1987

[54] WEATHERPROOFED ULTRASONIC TRANSDUCER ASSEMBLY AND SYSTEMS INCORPORATING SAME

[76] Inventor: John A. Dorr, 1706 Tipton Dr., Crofton, Md. 21114

[21] Appl. No.: 748,794

[22] Filed: Jun. 26, 1985

Related U.S. Application Data

[63] Continuation-in-part of Ser. No. 496,158, May 19, 1983, Pat. No. 4,530,077.

[51] Int. Cl.[4] .......................... G01S 15/93; H04R 1/34

[52] U.S. Cl. ....................................... 367/96; 367/140; 367/151; 367/909

[58] Field of Search ................. 367/140, 151, 909, 96; 310/335; 340/901, 904

[56] References Cited

U.S. PATENT DOCUMENTS 3,243,768 3/1966 Roshon, Jr. et al. ............... 367/151

4,500,977 2/1985 Gelhard .......................... 367/909 X

*Primary Examiner*—Richard A. Farley

*Attorney, Agent, or Firm*—Jim Zegeer

[57] ABSTRACT

An ultrasonic transducer assembly incorporating an ultrasonic transducer and conically surfaced beam transformer wherein the conical surface of the beam transformer is mounted on the interior of closure means or end cap that seals the transducer (and any associated mechanisms) from the environment during non-operating periods and is moved into the prescribed position via rotational motion or a linear piston-like motion prior to operating periods. Suitable O-ring or gasket sealing means preserve the water tight integrity during non-operating periods and assures a seal during translational movements of the transducer assembly from operating to non-operating positions. On school buses, the beam transformer is translated to an operative position below the bus where, in conjunction with a microprocessor, it takes an accurate acoustic image before the bus door is opened and again before the bus resumes forward motion so as to detect whether students have crawled under the bus while it was stopped. On cars and other vehicles, the ultrasonic transducer is used in back-up or parking systems to detect objects to the rear or front of the vehicle.

7 Claims, 14 Drawing Figures

FIG. 1
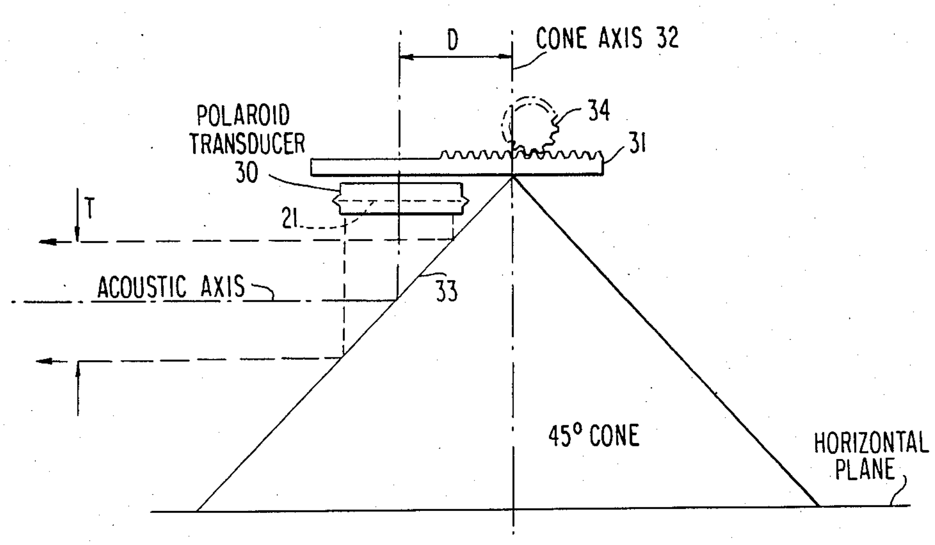
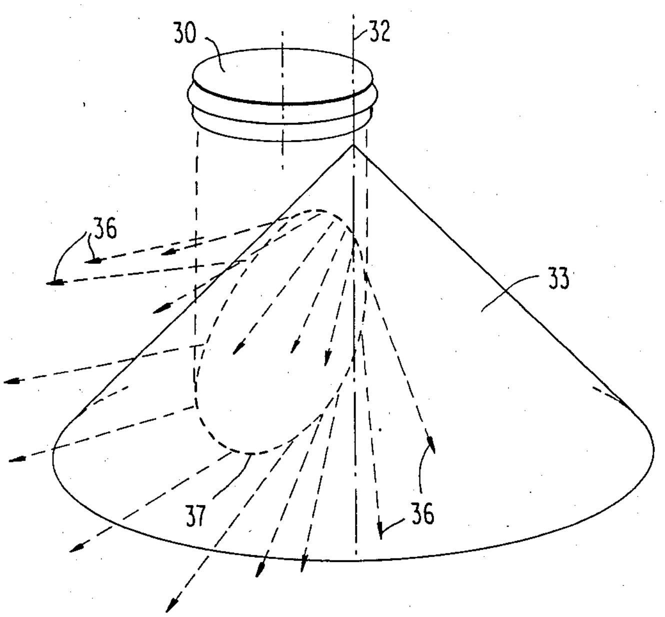
FIG. 2

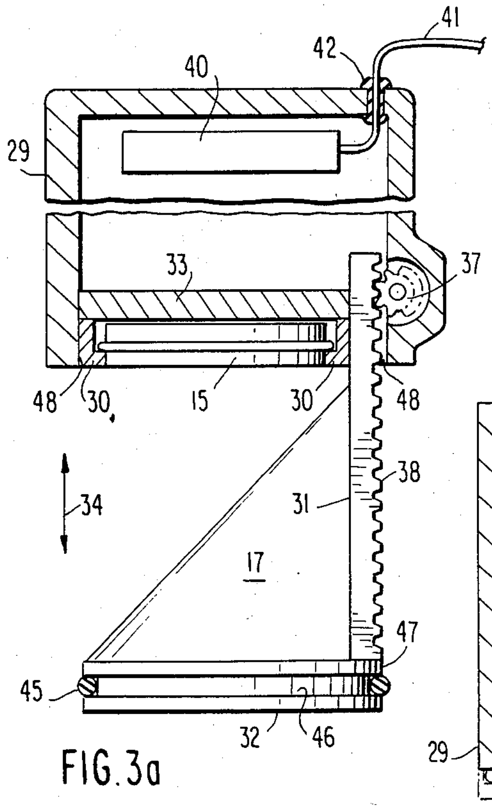
FIG. 3a
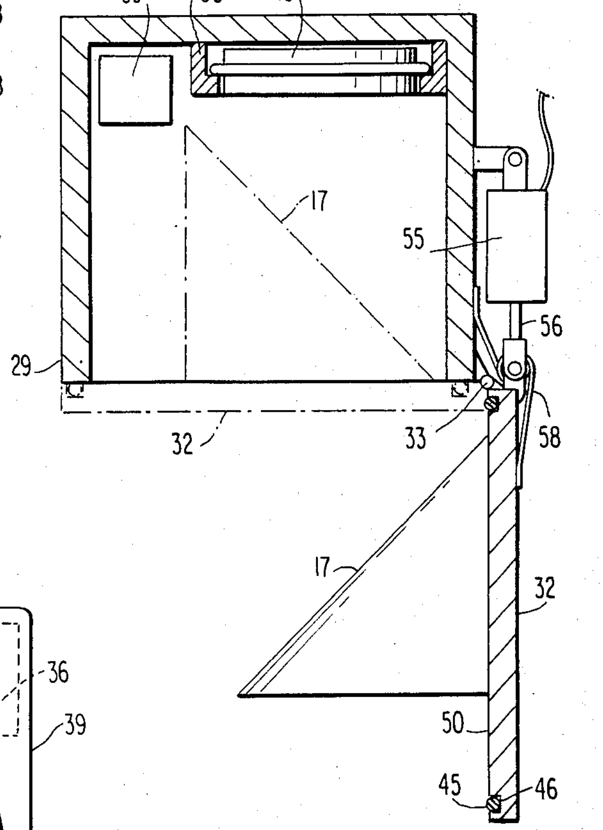
FIG. 4
FIG. 3b
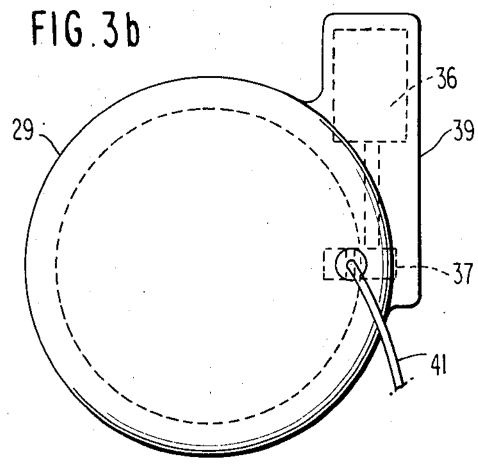

FIG. 5
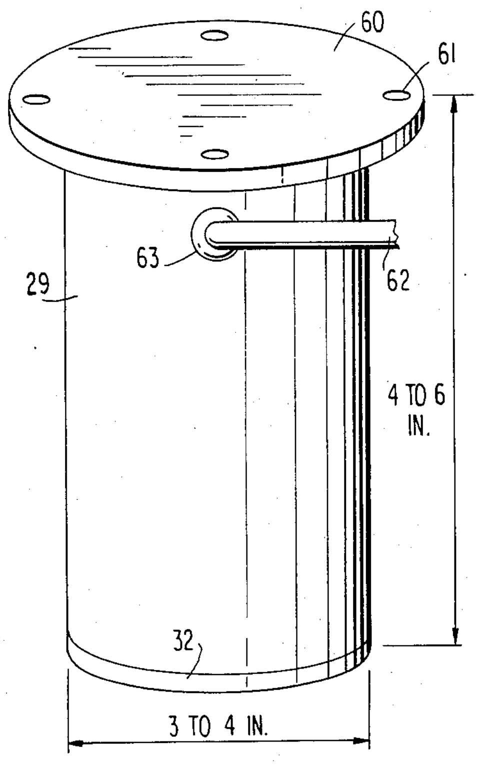
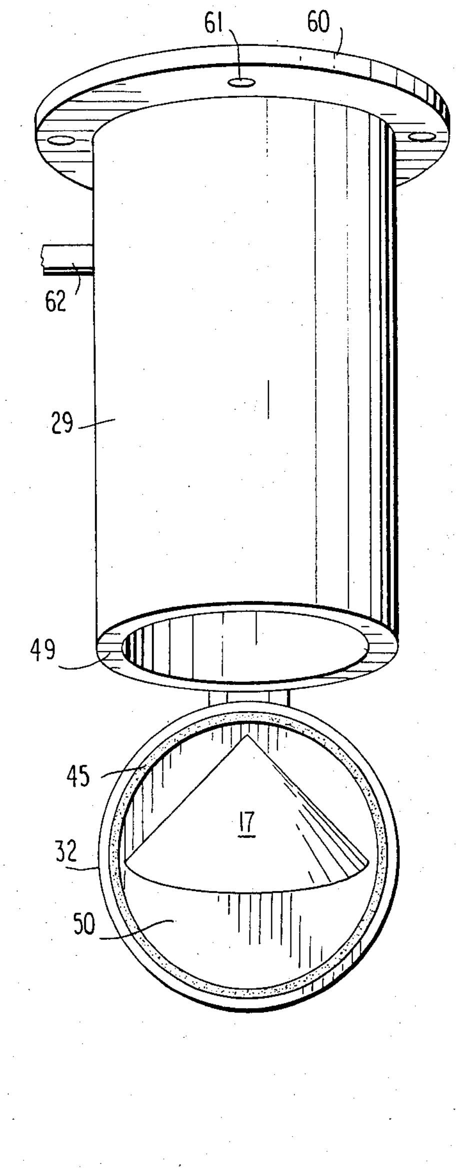
FIG. 6

FIG. 8
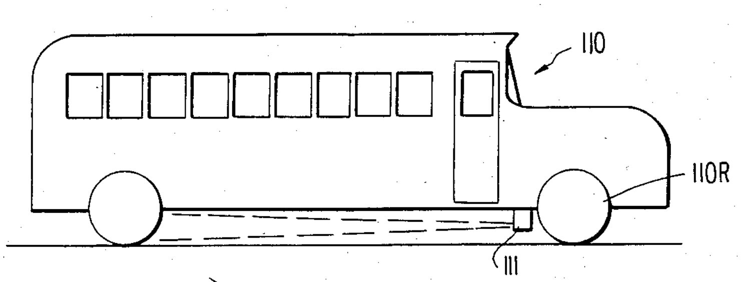
FIG. 9
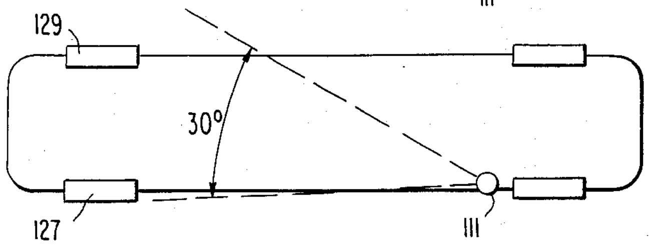
FIG. 10
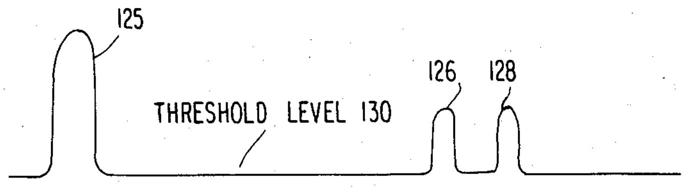
FIG. 11
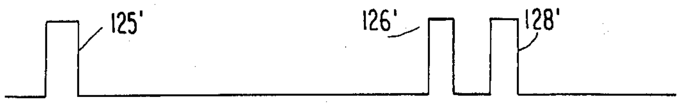
FIG. 12
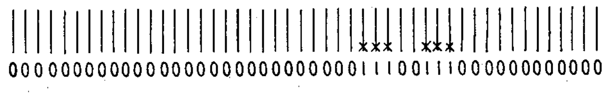
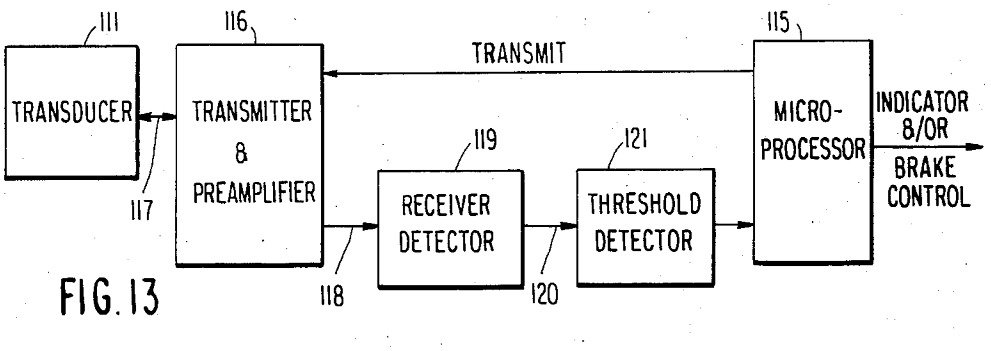
FIG. 13

WEATHERPROOFED ULTRASONIC TRANSDUCER ASSEMBLY AND SYSTEMS INCORPORATING SAME

REFERENCE TO RELATED APPLICATIONS

This invention is a continuation-in-part of my application Ser. No. 496,158 filed May 19, 1983, now U.S. Pat. No. 4,530,077.

BACKGROUND OF THE INVENTION

There are a number of instances where ultrasonic transducer assemblies are used for sensing positions, and in the case of vehicular use, ultrasonic transducers are used as in sonar assisted reversing systems in which ultrasonic transducers, controlled by microprocessors monitor a vehicle's path during any reversing maneuver and when it detects a presence of a moving or stationary object, computes the distance and provides a display to the driver and with also possible warning systems. In such systems, when a reverse gear is engaged, an "eye lid" cover protects the sensor from road dirt and damage flips up out of the way so as to permit ultrasonic systems to immediately go into operation.

In my above-identified application, a beam transformer is positioned in the near field of the ultrasonic transducer so as to unidirectionally expand the beam to thereby transform the narrow beam to a broad beam with the beam transformer being an effective coupling element for the emitted beam and the return echo for the sensing and ranging systems which both do not have significant alignment problems. Dirt, road grime and the like which can collect on an unprotected reflecting surface can seriously interfer with the operation thereof and water and moisture can adversely affect operation of the electrostatic transducer.

According to the present invention, the conical surface of the beam transformer is mounted on the interior of a closure member or end cap that seals the transducer and any associated mechanism from the environment during non-operating periods and which is moved by a solenoid or motor into the prescribed position via rotational (hinged) motion or linear (piston-like) or rack and pinion motion prior to operating periods. Suitable O-ring or gasket sealing elements preserve water tight integrity during non-operating periods.

In one particular system incorporating the invention, a school bus is provided with one or more transducer assemblies including an electrostatic beam generator and a beam transformer, which are translated to an operative position below the bus where, in conjunction with a microprocessor, it takes an acoustic image before the bus door is opened and, again, before resuming forward motion to detect students who may have crawled under the bus while it was stopped.

On cars, trucks and the like, the ultrasonic transducer can be used to measure distances for back-up purposes or for parking systems to detect object to the rear or front of the vehicle and provide indications of same to the driver.

Thus, an object of the invention is to provide an improved ultrasonic transducer assembly which, during non-operating periods is maintained clean and in a water tight condition so as to maintain efficient operation thereof.

BRIEF DESCRIPTION OF THE DRAWINGS

The above and other objects, advantages and features of the invention will become more more apparent when considered with the following specification and accompanying drawings whereing:

FIG. 1 is a side elevational view of an electrosonic transducer assembly as disclosed in my above-identified patent application, FIG. 2 is a side perspective view thereof, FIG. *3a* is a sectional side elevational view disclosing the assembly wherein the transducer assembly is translated in a linear direction.

Figure 7:
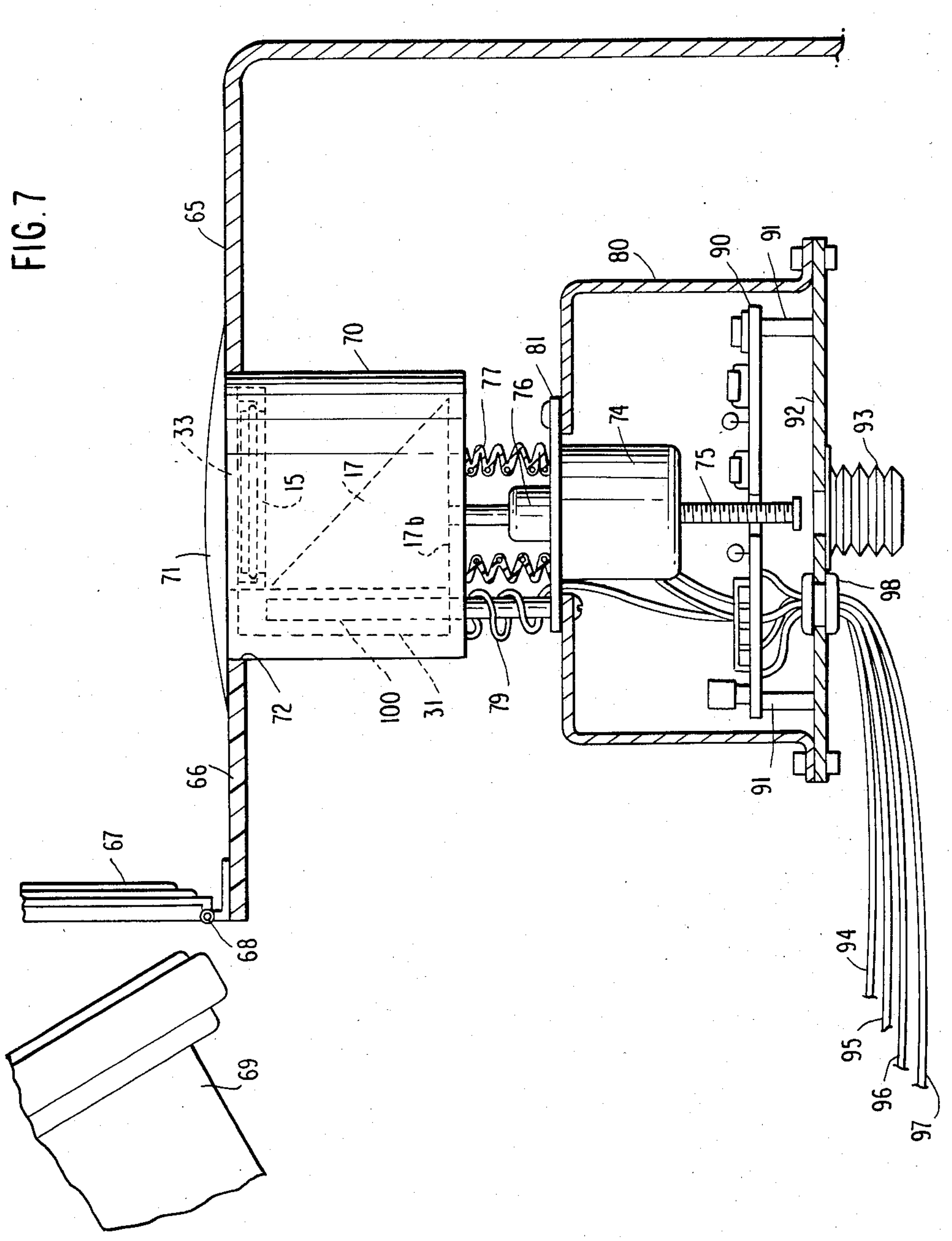

FIG. *3b* is a top plan view showing the drive motor housing,

FIG. 4 is a side sectional view in which the beam transformer is mounted on a hinged cover plate which is translated to and from a sealing and protected weather tight condition to an operating condition or position, FIG. 5 is a back view of the top with a reflector or beam transformer in a retracted condition, FIG. 6 is a front bottom view showing the beam transformer or reflector extended, FIG. 7 is a schematic illustration of the incorporation of the invention in a tail assembly of a motor vehicle, FIG. 8 is a side perspective view of a school bus incorporating the invention, FIG. 9 is a bottom plan view of the school bus of FIG. 8, FIG. 10 is a waveform diagram of the analog signal as received by the transducer assembly, FIG. 11 is a digitized version of the acoustic image of the under portion of the bus as seen by the transducer in it's operating position, FIG. 12 is a diagrammatic illustration of the generation of a characteristic number corresponding to the acoustic image shown in FIG. 11, and FIG. 13 is a schematic block diagram of the circuitry utilized for producing the waveforms of FIGS. 10, 11 and 12.

DETAILED DESCRIPTION OF THE INVENTION

As shown in FIG. 1, a planar electrostatic transducer or generator 15, which is in the preferred embodiment, is a Polaroid Corporation type electrostatic transducer, which is driven to produce a pulsed ultrasonic beam at about 50 kHz and which is approximately 10 degrees wide. Transducer 15 is supported on an adjustable frame 14 so that it is laterally adjustable relative to the axis 16 of the beam transformer 17. Beam transformer 17 is a 45 degree reflector that is placed in the near field of the transducer 15 and the resulting beam acoustic axis lies in a plane normal to the axis of the cone with the resulting beam being unidirectional in the normal plane; and when the displacement D is very large, the resulting beam shape closely approximate the shape of the undisturbed transducer beam. The $-3$ db beam width in the plane contain the reflective acoustic axis and the axis of the cone (the vertical plane) varies from about 10 degrees at $D=N$ to about 20 degrees at $D=0$. The transformer beam widths are unpredictable only in proportion to the unpredictability of the beam width of the transducers 15 themselves. To produce an expanded 40 degree beam in a horizontal plane for projection over a predetermined detection area, the displacement should be approximately one inch ($D=1''$). The consequent beam width in the vertical plane is no more than 15 degrees and consequently, the resulting loss in signal to noise ratio is no more than 20 log (10/15)= −3.5 db. The Polaroid Corporation type transducer 15 features a low Q (about 5.5) and therefor is very suitable for broadband (high resolution) operation.

Adjustment of the position of transducer 15 relative to the axis 16 of the cone 17 is by means of a rack and pinion arrangement generally indicated as 20 in FIG. 1. Since the transducer in this embodiment is always positioned on one side of the cone, the right side of the cone may be physically eliminated as will be described in the embodiments of the invention later herein. The geometric surface upon which the acoustic reflection takes place has all points thereof in a surface which is generated by the revolution of a straight line about a fixed axis 16 which is normal to the plane of the electrostatic transducer. The transducer element 15 is shown as including a planar element 21 which generates compression and rarefaction waves which are essentially perpendicular to its planar surface and hence the beam is relatively narrow. As shown in FIG. 2, the projection of the planar element of transducer 15 upon a conical surface 17 causes the points of impingement of the beam from the surface of the element 21 to be reflected at 90 degree angles with the curvature of the surface expanding the beam but only in the direction of curvature. The "thickness" of the beam in the vertical direction is unaffected by the beam transformer 33 so that beam expansion is only in a horizontal plane (relative to FIG. 1). The emitted or transmitted beam 25 is transmitted along the acoustic axis which, shown in FIG. 1, is horizontal but, as will be described hereafter may be vertical, horizontal or at any angle so long as it is aimed at a zone of inspection or detection within the range. It will be appreciated as disclosed in my above-identified application that acoustic absorbing material may be located on the cone or around the paths of the transducer assembly so as to eliminated reverberation and echoes which degrade the efficient operation of the unit. Thus, the beam is essentially a thin, wide beam.

Referring now to FIG. 3*a*, the transducer assembly shown in FIG. 1 with the portions of the cone constituting the portions thereof not needed for beam transformation in this embodiment being removed as unneeded or unnecessary and acoustic absorber materials (not shown) being used where necessary to prevent unwanted reverberations. In the embodiments which follow, the electrostatic transducer 15 and the beam transformer 17 are given like numerals throughout. In FIG. 3*a* and FIG. 3*b*, the electrostatic transducer 15 is mounted in a support ring 30 which is secured by a standard 31 to a base or end cap member 32 with the beam transformer 17 being mounted thereon. Transducer support ring 30 is secured to a plate 33 and this assembly is urged or translated in a direction indicated by the arrow 34. The transducer assembly is retracted into the protective enclosure constituted by hollow cylindrical housing member 29 by a motor 36 driving a pinion gear 37 to which meshes with rack 38 on the side of standard 31 and protected in the enlargement 39 of housing 29. The electrical control circuitry is generally indicated at 40 with supply and signal lines 41 being lead through seal 42 to a power supply and controls for the motor 36. In the protected state, the transducer assembly will always be maintained in the housing 29. In this embodiment, an O-seal ring 45 is formed in an annular groove 46 in the peripheral edge 47 of bottom steel plate or end cap 32 so when translated to the protected position, seal ring 45 will engage and seal with the lower edge 48 of tubular housing member 29 to thereby protect the transducer assembly and particularly the reflecting surface from dirt and inclement weather. Signals to and from a utilization device are included in cable 41. The electrical circuitry can, if desired, be mounted on plate 32 and move therewith.

In the embodiment shown in FIG. 4, the electrostatic transducer 15 is mounted in a ring or holder 30 and is generally stationary and, the beam transformer 17 is mounted on an end cap or cover plate 32 which is hingedly pivotted as at 33 onto a bracket 34 forming a part of housing 29. O-seal or packing ring 45 is provided in an annular groove 46 in the surface 50 of end cap or seal member 32. In this arrangement, a solenoid 55 is coupled by an operating linkage 56 to hinge cover end cap 32 and energization of the solenoid 55 moves the beam transformer 17 into it's operative position relative to electrostatic beam generator 25 and, the solenoid can be double acting so as to return the cover 32 to a sealed protective relationship with respect to the transducer components or a spring 58 will can be used to close the cover upon deenergization of solenoid 55. In this embodiment, the electrical component circuitboards and the like can be housed in the space indicated generally at 59 in FIG. 4.

FIG. 5 is a perspective top view indicating a mounting flange 60 with holes 61 for mounting the unit on any structure desired. Exemplary dimensions are indicated on the drawing. A molded cable assembly 62 passes through a seal 63 to the interior of the compartment 29.

FIG. 6 is a perspective bottom view illustrating the beam transformer 17 of FIG. 4 pivotted to an operating position.

Referring now to FIG. 7, the invention is shown as being incorporated in a bumper assembly at the rear of a vehicle such as an automobile or truck and may be used to measure or monitor the vehicle's path during any reversing operation. As is known in the art, when the presence of a moving or stationary obstacle is detected, a properly programmed microprocessor computes the distance and reports it to the driver by way of a display and/or audible warning system or, if desired, be utilized to operate a braking system. As indicated, the bumper 65 of an auto includes a plastic plate 66 just below the license plate assembly 67 which pivots on pivot 68 to expose the gas fill assembly 69. A protected transducer assembly 70 having a plastic seal cap 71 which seals into an aperture 72 in bumper 65. The electrostatic beam generator 15 in this case, is reversed from its location as disclosed in the embodiments of FIG. 3. A digital linear actuator (such as Air Pax L92141-P2) has a lead screw 75 which passes through a seal 76 and a plastic bellows and seal spring 77 to engage the base 17*b* of the beam transformer 17 which, as in the case of FIG. 3, is coupled by a coupling standard 31 to the electrostatic beam generator 15. A transducer cable and service loop 79 extend from a sealed housing 80 which contains electronic circuitry to provide electric power and signalling to the electrostatic beam generator 15. Sealed unit 80 has a mounting flange 81 for securing thereto the digital linear actuator 74. A printed circuitboard 90 is mounted on a pair of brackets 91 on the base 92 of sealed housing unit 80, and an equalizing bellows 93 is coupled to the interior of the space in seal unit 80 so as to take into account temperature expansion and contraction as well as the movement of linear actuator rod 75 into and out of the sealed unit 80. Twelve volt electrical supply is provided on line 94 and ground from the back-up lights if provided on line 95 so that when the back-up lights are on, the electrical power is supplied to the unit. The electrical power is supplied to the printed circuitboard 90 upon which is mounted a microprocessor and other conventional electrical components. In this case, the electrical supply lines as well as the alarm signal lines 96 and 97 pass through a seal 98 to the printed circuitboard 90. Actuator control lines 99 pass from the control board to the digital linear actuator. The transducer cable service loop 79 passes through a seal (not shown) in seal unit 80 to be connected to the printed circuitboard.

The ground lead 95 on the back-up light circuit is energized or activated so as to energize the printed circuitboard thereby causing the digital linear actuator to be energized and translate the transducer assembly constituted by the electrostatic beam generator 15 and beam transformer 17 to project upwardly (in FIG. 7), an index pin 100 accurately maintaining the transducer assembly in a predetermined orientation relative to the rear of the vehicle. It will be appreciated that there may be several of the units as illustrated for taking views of different back-up paths.

Referring now to FIGS. 8–13, a school bus 110 is provided with a protected ultrasonic transducer assembly 111 which is positioned just to the rear of the right front wheel 110RF so as to be able to inspect a critical zone underneath the bus. In this case, when the bus 110 is stopped by the operator to receive or discharge school children passengers, the transducer 111 is popped down or dropped down from its protected housing and projects a thin, wide sensing beam of ultrasonic energy to the rearwardly and along the underside of the bus. Since the beam is a thin beam whose angle of width can be tailored to accomodate a wide range of angular limits, it can be adjusted by moving the electrostatic beam generator 15 towards or away from the axis of the cone of beam transformer 17. The basic objective is to design the beam width so that the space underneath the bus can have an acoustic image thereof taken just as the bus stops to discharge passengers and before the door is open and, after the door is closed and just before the bus starts so as to provide a signal to the driver of any obstruction that may have gone under the bus between the time of stopping of the bus and the time the driver seeks to move forward with the bus. Thus, the beam is projected rearwardly to produce an acoustic image of the underside of the bus.

The transducer 111 is controlled by a single chip microprocessor 115 (FIG. 13) which transmits signals under program control in any desired manner and the microprocessor can introduce a jitter in the transient to eliminate reflection from other sources. These signals control conventional transmitter and preamplifier circuit 116 which include conventional transmit and receive switches (not shown) and sends transducer drive pulses on line 117 to transducer 111 and to receive an amplifier return signals or echoes and apply same to line 118 which presents or supplies these signals to a conventional receiver detector circuit 119 the output of which on line 120 is an analog signal which constitutes an acoustic image of objects in the detection or beam path on the underside of the bus. This acoustic image is stored (in digital form in the random access memory of microprocessor 115) and compared with a later acoustic image of the same scene just prior to the driver seeking to move the bus forward to thereby detect the entrance of some object in the detection zone on the underside of the bus. The signal produced may be utilized to control the braking system of the bus in a manner known in the art. As shown in FIG. 13, the output from receiver detector 119 is passed through a threshold detector circuit 121 which produces the digital acoustic image shown in FIG. 11 which, in turn, is supplied on line 122 to the microprocessor 115.

Referring now to FIG. 10, this illustrates the detected analog signal level plotted against time and represents essentially an acoustic image of objects in the detection zone on the underside of bus 110. As diagrammatically illustrated, the first pulse is the transponder trigger pulse or the transmitter pulse 125 signifying the beginning of the acoustical image. This is the envelope of the RF signal and the first thing that is seen is a signal reflection 126 corresponding to the right rear wheel 127 of bus 110 and the second signal reflection 128 is a pulse representing the left rear wheel 129 of bus 110. It will be appreciated that other objects such as a curb or objects projecting on the underside of the bus such as the muffler, may also produce reflections which would be included in the acoustic image. If the threshold level 130 signals below this level are not detected and do not therefor appear in the equivalent digital acoustic image shown in FIG. 11. In FIG. 11, corresponding pulses are denoted with a prime number. The signal from threshold detector 124 is supplied to single chip microprocessor 115 which samples the digital signal beginning with the end of the transmission pulse 125. Each sampling time S1, S2, S3, S4 . . . SN is sampled and at each place where there is a pulse to derive a characteristic of the acoustic image. In the sample signal illustrated in FIG. 12, there are six hits (X) which are assigned a value of "1" and non-hits which are assigned a value of "0" and constitute, over a time period T, the "1"s and "0"s constituting a characteristic number for the acoustic scene representative of acoustic image on the underside of the bus.

Whenever a child, for example or other object comes into the acoustic scene or view of the transducer, this characteristic number will change to something else (a Δ change) which is indicative that there is something in the detection zone under the bus that wasn't there before and thus produce a signal on the output of the microprocessor 115 which will operate an indicator or the brake control of the bus 110 until the condition is clarified.

Microprocessor 115 can randomize sampling somewhat to introduce a jitter, which is essentially jittering the sampling of the signal so that there is no samplings at the same point relative to the target. In other words, the sampling is oscillating back and forth across the analog signal. The transmission interval can be changed to conform to what changes there may be in the ultrasonic velocity due to temperature, humidity, etc., and the atmospheric changes. The peaks of the signals shown in FIG. 10 are not utilized according to this embodiment but it is obvious that the microprocessor can be programmed to analyze peak amplitudes, if desired. It will be appreciated that several transducers can be positioned on the underside of the bus, each of which is controlled by the microprocessor, for example, there can be four transducers, one viewing from each of the four corners and each of their individual scenes analyzed by the microprocessor in the same way as described above with due regard being had for the transmission times and ringing times for each of the transducers so that they do not introduce ambiguities in the transmissions of the others. The microprocessor can easily be programmed to control the different transmission and reception times in a multiplexing fashion so that the outputs of each of the transducers can be analyzed in sequence or any desired sequence.

Microprocessor 115 may have programmable read-only memories (PROM) for storing the program and the sequence of transducer operation and random access memories of the microprocessor may be used to store the acoustic images (e.g., the string of 0's and 1's shown in FIG. 12) which is the characteristic number of the acoustic images for use in the comparison. The programming of the microprocessor is conventional and routine.

While I have shown and described a preferred embodiment of the invention, it will be appreciated that this disclosure is for the purpose of illustration and various changes and substitutions of equivalent elements may be made without departing from the spirit and scope of the invention as set forth in the appended claims:

What is claimed is:

1. A weatherproofed ultrasonic transducer assembly for transmitting and receiving ultrasonic energy in the air comprising,
   - housing means having a seal surface thereon,
   - a planar electrostatic transducer element for generating a narrow beam of ultrasonic energy and propogating same in a predetermined direction,
   - means for mounting said transducer element in said housing,
   - a beam transformer for spreading said narrow beam from said electrostatic transducer in a single unidirectional direction, said beam transformer being comprised of a portion of the surface of a cone located within the near field of said electrostatic transducer,
   - the edge of said surface of a cone remote from said electrostatic transducer having seal means formed thereon for sealing engagement with said housing seal surface, and
   - translating means for translationally moving said beam transformer surface from where said housing seal surface in said housing means is in sealing relationship with said seal means to a position whereby it is exposed to the elements for reflectively expanding and transmitting ultrasonic energy from said electrostatic transducer element.

2. The invention defined in claim 1 including coupler means coupling said transducer element and said beam expander for translationally movement of said transducer element and said beam transformer as a unit.

3. The invention defined in claim 1 wherein said housing is a hollow tubular member and said beam transformer includes means pivotally coupling said portion of a surface of a cone for movement about an arc to operative position.

4. The invention defined in claim 3 including solenoid means for translationally moving said beam expander to transmit and receive position, and spring means for returning said beam expander to a protected position in said housing upon deenergization of said solenoid.

5. In a vehicle back-up system, ultrasonic transducer assembly as disclosed in claim 1, means for mounting said housing in the rear of said vehicle, means for actuating said translating means to position said beam transformer in a transmit receive position.

6. In a school bus in combination with the ultrasonic transducer assembly defined in claim 1, means mounting said housing such that said transducer projects an expanded ultrasonic beam under the bus prior to opening the door of said bus,
   - means for energizing said transducer element to transmit ultrasonic beam,
   - electrical circuit means connected to said transducer element for developing a first electrical signal corresponding to a first acoustic image of the underside of said school bus prior to opening the door thereof,
   - means for storing said first electrical signal corresponding to said first acoustic image while school children are departing and entering said school bus,
   - means for developing a second electrical signal corresponding to said acoustic image upon closing the door of said school bus,
   - means for comparing said stored acoustic image obtained prior to opening the school bus door with said second acoustic image, and
   - indicator means for indicating the differences in said acoustic images as a signal of the presence of a child under the school bus.

7. The school bus defined in claim 6 including means for locking the brakes of said school bus upon said indicator indicating the presence of a child under the bus.

* * * * *

UNITED STATES PATENT AND TRADEMARK OFFICE

CERTIFICATE OF CORRECTION

PATENT NO. : 4,654,834
DATED : March 31, 1987
INVENTOR(S) : John A. Dorr

It is certified that error appears in the above-identified patent and that said Letters Patent is hereby corrected as shown below:

On the title page Insert

--(73) Assignee: Xecutek Corporation --.

Signed and Sealed this

Twenty-sixth Day of April, 1988

*Attest:*

DONALD J. QUIGG

*Attesting Officer* *Commissioner of Patents and Trademarks*